United States Patent [19]

Sugisawa et al.

[11] Patent Number: 4,842,872
[45] Date of Patent: Jun. 27, 1989

[54] METHOD OF PRODUCING RETORT FOOD

[75] Inventors: Ko Sugisawa; Yasushi Matsumura, both of Nara; Hidefumi Okamoto, Sakai; Kumiko Abe, Kurashiki, all of Japan

[73] Assignee: House Food Industrial Company Limited, Osaka, Japan

[21] Appl. No.: 91,878

[22] Filed: Sep. 1, 1987

[30] Foreign Application Priority Data

Sep. 11, 1986 [JP] Japan .............................. 61-214788

[51] Int. Cl.$^4$ ...................... A23L 1/305; A23L 1/238; A23L 1/31; A23L 1/325
[52] U.S. Cl. ..................................... 426/46; 426/523; 426/641; 426/643
[58] Field of Search .................. 426/523, 641, 643, 46

[56] References Cited

U.S. PATENT DOCUMENTS 3,124,465  3/1964  Watanabe et al. .................... 426/46

OTHER PUBLICATIONS

Oriental Cook Book–Better Homes and Gardens, 1977, Meredith Corp., Iowa, pp. 70 and 72.
Webster's 9th New Collegiate Dictionary, 1968, Merriam-WSebster, Inc., Springfield, Mass., p. 537.

Primary Examiner—Donald E. Czaja
Assistant Examiner—Helen Pratt
Attorney, Agent, or Firm—Oblon, Fisher, Spivak, McClelland, Maier & Neustadt

[57] ABSTRACT

A method of producing retort food comprises the steps of enclosing and sealing in a packaging container meat such as animal meat or fish meat broiled with a flavoring liquid containing a soy component in such a manner that the content of amino nitrogen originating from said soy component within the flavoring liquid is 0.08 to 0.25% by weight and also containing 4.8 to 8.0% by weight of salt, and subjecting the meat to retort sterilization processing at a temperature of 115° to 130° C. under a gauge pressure of 0.8 to 1.7 kg/cm$^2$ for 5 to 60 minutes.

This method is applicable to the production of retort foods from various soy-broiled meats and is capable of eliminating browning and generation of any unpleasant taste.

7 Claims, No Drawings

METHOD OF PRODUCING RETORT FOOD

CROSS-REFERENCE OF THE RELATED APPLICATION

This application is related to the application Ser. Nos. 030,347 (filed on Mar. 27, 1987) and 035,190 (filed on Apr. 7, 1987), which were assigned to the assignee of this application.

BACKGROUND OF THE INVENTION

1. Field of the Invention

The present invention relates to a method of producing retort food comprising animal meat such as beef or pork, or fish meat such as horse mackerel, spanish mackerel, bonito, or tuna, which meat is broiled with soy sauce and packaged.

2. Prior Art

The technique of retort sterilization processing various foods after they have been packed and sealed, thereby to improve the storability of the foods, in retort containers, has conventionally been known. Specifically, various foods such as cooked curries, soups and stews are widely sold as retort food. The number of types of foods packed in retort containers are subjected to retort processing increases every year. In addition, techniques of retort sterilization processing broiled foods have been proposed. For example, Japanese Patent Publication No. 54-37214 discloses that a cut eel is broiled and then dried until the surface of the eel hardens in order to be vaccum-packaged, and Japanese Patent Publication No. 57-33010 discloses that a meat or fish is charged in a bag and thereafter the air in the bag is replaced by a carbon dioxide gas or a mixture of carbon dioxide and nitrogen gas to subject it to sterilization processing. Fathermore, Japanese Patent Unexamined Publication (KOKAI) No. 59-166061 discloses that a dried fish is immersed in a seasoning solution, broiled and vacumm-packaged, and Japanese Patent Unexamined Publication No. 55-150879 also discloses that a flatfish is immersed in a seasoning solution, slightly dried, and vaccum-packaged to subject it to high pressure (1.5-2 atoms) - heat (110°-120° C.) treatment.

However, since retort sterilization is a method in which cooked food is put in a high-pressure sterilizing pot after the food has been enclosed and sealed within a retort container, and in which the food is sterilized under pressure at a high temperature of not less than 100° C., there is a risk that some types of foods may become discolored, generate an offensive smell, or have an unpleasant taste. In particular, when broiled meat or meat broiled with soy sauce (hereinafter generically referred to as "soy-broiled meat"), which is cooked either by broiling the meat after it has been soaked in soy sauce or by broiling the meat while soy sauce is added thereto, is subjected to retort processing so as to produce retort food, there has been encountered a problem in that the meat may brown considerably during the retort processing or the meat may have an unpleasant bitter taste.

SUMMARY OF THE INVENTION

Accordingly, it is a primary object of the present invention to provide a method of producing retort food which is applicable to the production of retort foods from various soy-broiled meats and which is capable of eliminating the browning and the generation of any unpleasant taste. This and other objects of the present invention will be clear from the following description.

The present invention has been accomplished on the basis of the finding that the above-stated problems can be effectively solved if a flavoring liquid containing soy sauce components and salt respectively within particular content ranges is used as the flavoring liquid employed for producing soy-broiled meat.

According to the present invention, there is provided a method of producing retort food comprising the steps of: enclosing and sealing in a packing vessel meat broiled with a flavoring liquid containing a soy component in such a manner that the content of amino nitrogen originating from the soy component within the flavoring liquid is 0.08 to 0.25% by weight, preferably 0.12 to 0.2% by weight, and also containing 4.8 to 8.0% by weight, preferably 6.0 to 7.5% by weight, of salt; and subjecting the meat to retort sterilization processing.

DESCRIPTION OF THE PREFERRED EMBODIMENTS

Examples of meats which may be used to provide meat in accordance with the present invention are animal meats such as beef, pork, poultry, and mutton, as well as fish meats such as sardine, horse mackerel, pacific saury, mackerel, salmon, flatfish, sea bream, pollak, yellowtail, spanish mackerel, hairtail, herring, bonito, and tuna. A fish meat material may have any form such as a complete fish or slices (a half body or a fish opened into two pieces) obtained by cutting a fish in a suitable manner.

In accordance with the present invention, the above-described meat is broiled by, for instance, direct heating with flame or infrared rays. In this broiling, the meat is broiled by a method in which the meat is broiled after it has been soaked in a flavoring liquid (or after a flavoring liquid has been spread on the meat), a method in which a flavoring liquid is added to the meat while the meat is broiled, or a method which is a combination of these methods.

Preferably, the meat should be broiled in such a manner that it will not have many scorched parts; for example, it may be broiled by direct heating with a flame of medium or low strength. This manner of broiling the meat, when combined with the effect provided by the flavoring liquid employed in accordance with the present invention, enables the more effective prevention of the browning of the meat and the generation of a bitter taste during the retort sterilization processing.

The flavoring liquid employed in accordance with the present invention is prepared by using soy, salt, and other components in such a manner that the content of amino nitrogen originating from the soy component within the flavoring liquid and that of salt are 0.08 to 0.25% by weight (hereinafer abbreviated to "%"), preferably 0.12 to 0.2%, and 4.8 to 8.0%, preferably 6.0 to 7.5%, respectively. Such a flavoring liquid can be prepared by allowing the flavoring liquid to contain either 15 to 35% (preferably 20 to 30%) of light-colored soy sauce and 1.5 to 3.5% (preferably 1.8 to 2.7%) of salt, or 10 to 30% (preferably 15 to 25%) of dark-colored soy sauce and 1.8 to 6.0% (preferably 2.0 to 3.5%) of salt.

If soy sauce is added in such a small amount that the content of amino nitrogen originating from the soy component within the flavoring liquid is less than 0.08%, even if the salt content within the flavoring liquid is made not less than 8.0%, it is impossible to obtain good tasting soy-broiled meat. On the other hand, if soy is added in such an amount that the amino content of nitrogen originating from the soy component within the flavoring liquid exceeds 0.25%, the browning of the meat and the generation of a bitter taste during the retort sterilization processing cannot be prevented effectively. Briefly stated, by virtue of preparing the flavoring liquid by using the above-stated ratios, it is possible to effectively prevent the browning of the meat and the generation of a bitter taste during the retort sterilization processing and, simultaneously, to allow the meat to have a good taste of soy-broiled meat after the meat has been sterilized.

If desired, the flavoring liquid may contain sweet sake, sugar, Japanese sake, chemical seasonings, starch, various thickeners, etc.

Preferably, the amount in which the flavoring liquid is used (i.e., the amount of the flavoring liquid added to the meat by soaking the meat or spreading the flavoring liquid) should be 2 to 25% of the weight of the meat. When meat is soaked in a flavoring liquid before the meat is broiled, the meat should be soaked in the flavoring liquid in a condition of being entirely soaked for a period of 15 to 90 minutes, so as to obtain the above-mentioned amount of use of the flavoring liquid.

In accordance with the present invention, the broiled meat is placed in a packaging container such as a pouch, a dish-like container having a film cover for covering its upward-facing opening, or a dish-like container, and the container is accommodated in a pouch or a can-type container in a sealing manner. The container may be made of any material which is waterproof and can withstand heat during the retort sterilization. Such material may be mainly constituted by one of the following raw materials: for example, nylon, polyester, polyethylene, polypropylene, polyvinyl chloride, and aluminum foil.

When sealing the meat in the container, the sealing should preferably be effected by vacuum packaging. Instead, however, the sealing may be effected after the container has been filled with an inert gas.

In accordance with the present invention, the sealed container is then subjected to retort heating sterilization processing by effecting a retort sterilization such as a steam retorting or hot-water retorting. The processing is performed, for example, under a pressure of 0.8 to 1.7 kg/cm$^2$ (gauge pressure), preferably 1.0 to 1.5 kg/cm$^2$ (gauge pressure), at a temperature of 115 to 130° C., preferably 121° to 127° C., for 5 to 60 minutes. If the processing is effected under these conditions, it is possible to prevent the browning of the meat and the generation of a bitter taste during the retort sterilization processing more effectively, while sterilizing the meat.

The present invention thus provides a retort food comprising packaged broiled meat which is free from the browning and the generation of any bitter taste during the retort sterilization processing.

Therefore, by merely heating the retort food produced by the method of the present invention, for example, in hot water or in a microwave oven before the food is served, it is possible to obtain soy-broiled meat having the same flavor as that of meat just cooked.

The present invention will now be described below by non-limitative examples.

EXAMPLE 1

A 100 g slice of yellowtail was soaked in a flavoring liquid comprising 25 g of light-colored soy, 2 g of salt, 50 g of sweet sake, and 25 g of water (in which the content of amino nitrogen originating from the soy component was 0.19%, and that of salt was 6.6%) for 30 minutes. (The weight of the flavoring liquid remaining on the slice of yellowtail was about 7 g.) Thereafer, the slice of fish was broiled by direct heating with a flame of medium or low strength until it was slightly scorched. The broiled slice of yellowtail was then packaged under vacuum in a pouch made of SM nylon and measuring 130 mm by 175 mm, and was then subjected to retort sterilization processing in the manner of steam retorting under a pressure of 1.5 kg/cm$^2$ at a temperature of 121° C. for 24 minutes, thereby being completed as a product.

In accordance with the above-described method, no extreme browning was observed on the slice of yellowtail, and a good color of soy-broiled meat was obtained. When the slice of fish was served after being heated in a microwave oven after it had been preserved at room temperature for 6 months, it had no bitter taste and had a good taste and a good flavor of soy-broiled meat.

EXAMPLE 2

A 100 g slice of yellowtail was broiled by direct heating with a flame of medium or low strength until the core of the slice of fish was heated. A flavoring liquid comprising 25 g of light-colored soy, 2 g of salt, 50 g of sweet sake, and 25 g of water (in which the content of amino nitrogen originating from the soy component was 0.19%, and that of salt was 6.5%) was spread on the slice of fish three times and the slice of fish was broiled until it became dry (The weight of flavoring liquid spread on the slice of yellowtail was about 9 g). Subsequently, the slice of yellowtail was packaged under vacuum in a pouch made of SM nylon and measuring 130 mm by 175 mm, and was then subjected to retort sterilization processing in the manner of steam retorting under a pressure of 1.5 kg/cm$^2$ at a temperature of 121° C. for 24 minutes, thereby being completed as a product.

In accordance with the above-described method, no extreme browning was observed on the slice of yellowtail, and a good color of soy-broiled meat was obtained. When the slice of fish was served by being heated in hot water after it had been preserved at room temperature for 6 months, it had no bitter taste and had a good taste and a good flavor of soy-broiled meat.

What is claimed is:

1. A method of producing retort food comprising the steps of: enclosing and sealing in a packaging container meat broiled with a flavoring liquid containing a soy component in such a manner that the content of amino nitrogen originating from said soy component within the flavoring liquid is 0.08 to 0.25% by weight and also containing 4.8 to 8.0% by weight of salt; and subjecting the meat to retort sterilization processing.

2. A method according to claim 1, wherein the meat is animal meat or fish meat.

3. A method according to claim 1, wherein the content of amino nitrogen originating from the soy component contained in the flavoring liquid is 0.12 to 0.2% by weight.

4. A method of according to claim 1, wherein the content of salt contained in the flavoring liquid is 6.0 to 7.5% by weight.

5. A method according to claim 1, wherein the flavoring liquid is added to the meat in an amount of 2 to 25% by weight of the meat.

6. A method according to claim 1, wherein the meat is soaked in the flavoring liquid for 15 to 90 minutes.

7. A method according to claim 1, wherein the retort sterilization processing is conducted at a temperature of 115 to 130° C. under a gauge pressure of 0.8 to 1.7 kg/cm$^2$ for 5 to 60 minutes.

* * * * *